United States Patent

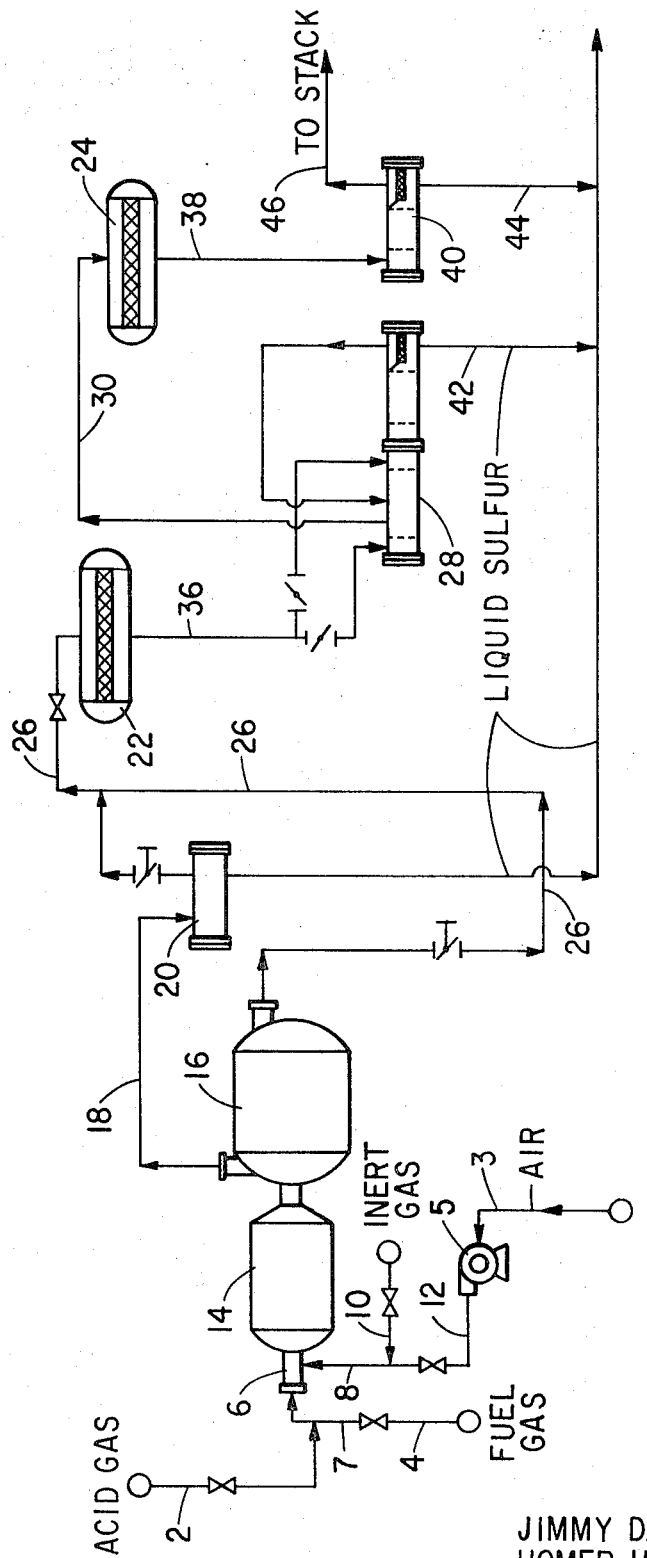

[11] 3,617,221

| [72] | Inventors | Jimmy D. Egan<br>Tyler;<br>Homer H. Woodall, Jr., Tyler, Tex.; Lorenz<br>V. Kunkel, Tulsa, Okla. |
|---|---|---|
| [21] | Appl. No. | 875,847 |
| [22] | Filed | Nov. 12, 1969 |
| [45] | Patented | Nov. 2, 1971 |
| [73] | Assignee | Pan American Petroleum Corporation<br>Tulsa, Okla. |

[54] PROCEDURE FOR COOLING DOWN SULFUR PLANT FOR INSPECTION
10 Claims, 1 Drawing Fig.

[52] U.S. Cl. .................................................. 23/225 P
[51] Int. Cl. .................................................. C01b 17/04
[50] Field of Search ......................................... 23/224–6;
263/44, 52; 431/6; 208/154

[56] References Cited
UNITED STATES PATENTS
1,339,190  5/1920  Fuller .......................... 263/52 X
3,366,455  1/1968  Childers et al. ................ 23/225
FOREIGN PATENTS
1,531,496  5/1968  France ......................... 23/225

Primary Examiner—Oscar R. Vertiz
Assistant Examiner—G. O. Peters
Attorneys—Paul F. Hawley and Arthur McIlroy ABSTRACT: A method is provided by which the procedure for cooling down a refractory lined furnace used in a sulfur recovery plant can be substantially accelerated by using an inert gas such as nitrogen, carbon dioxide, steam, etc., to moderate the burner flame temperature to a level of not more than about 2,600° to 2,700° F. while the furnace is fired on fuel gas–the acid gas flow being shut off. In this way, free sulfur that has accumulated on the refractory and fire brick during operation of the furnace is volatilized and removed therefrom. Thereafter the furnace may be cooled with air at a rate such that the cooling is not more than about 100° per hour until the interior of the furnace is cool enough for inspection.

PROCEDURE FOR COOLING DOWN SULFUR PLANT FOR INSPECTION

The present invention relates to the manufacture of free sulfur from hydrogen sulfide containing gases. It is concerned with improvements in the overall operating efficiency of this process and in particular, improvement in the efficiency of the cooling down techniques currently used for permitting periodic inspection of the furnace, boiler, etc.

BACKGROUND OF THE INVENTION

The investment involved in sulfur recovery plants generally ranges from about $100,000 for units having a capacity of about 10 tons/day to in excess of $1,000,000 for plants recovering 500 tons or more a day. Accordingly, from the standpoint of economics, it is of extreme importance that only a minimum of down time is experienced if a proper return on such an investment is to be realized. One of the difficulties encountered in this regard is the time required for starting up or shutting down and restarting a plant of this kind.

Since sulfur is present in a sulfur plant furnace and in the catalyst, special precautions are required to cool down the equipment for inspection or catalyst removal. If air is used to cool the equipment when sulfur is present, dangerous sulfur fires develop which produce high temperatures and evolve corrosive sulfur trioxide and sulfuric acid. During warmup of the equipment containing sulfur, it is necessary that all excess air be excluded and that the furnace flame temperature be moderated to prevent damage to the refractory. If sulfur is present and excess air is used for furnace temperature moderation during warmup corrosive sulfuric acid will be produced.

In the startup procedure the catalyst bed or beds generally must be heated to a temperature of about 400° to 450° F. To accomplish this object, however, usually requires—for the larger plants at least—from 2 to 3 days because of the low controlled firing rate which employs only from 10 to 15 percent of design air in order to allow radiation cooling to reduce the gas temperature and protect the refractory lining of the furnace. While the catalyst beds, of course, could be heated to the desired temperature level faster if higher firing rates were used, such an operation can only be done at the risk of destroying the furnace refractory which usually melts at temperatures of the order of about 2,700° to 3,000° F. The use of excess air to reduce the flame temperature is not possible because of the danger of sulfur fires and excessive corrosion.

Even longer periods of time are required when it is desired to shut down a sulfur recovery plant for inspection or repairs. In such cases the hot refractory lining of the furnace is cooled by radiation. For example, a furnace large enough to process gas streams yielding approximately 300 tons of sulfur per day ordinarily requires about 6 days to cool down to a temperature level, i.e., about 300° F., at which the free sulfur therein will not ignite on contact with air. Thereafter an air blower can be used to cool the furnace sufficiently to permit inspection. Usually such shutdowns are necessary about once a year thus losing from 7 to about 10 operating days per year.

In a recently issued patent (U.S. Pat. No. 3,366,455, issued 1-30-68 to L. E. Childers et al.) it is disclosed that this downtime period can be substantially shortened by injecting into the hot furnace steam or an inert gas such as nitrogen, carbon dioxide, etc. However, calculations show that the volume of nitrogen, for example, required to cool the refractory to the desired extent in one train of a 580 ton per day plant would exceed 3,000,000 cubic feet costing in excess of $10,000 even at a price of 30 per gallon for liquid nitrogen. The approximate sulfur production loss from shutting down one train of a plant of the above size amounts to about 290 long tons per day or a cost of about $8,700 per train per day, figuring sulfur at $30.00 per ton. Accordingly, the use of nitrogen alone to accomplish this cooling down operation is not economically attractive even though the time required for the complete turn around is reduced from 10 to about 3½ days.

SUMMARY OF THE INVENTION AND DESCRIPTION OF DRAWING

The accompanying drawing is a schematic representation of a single train sulfur plant of the type contemplated herein showing modifications required in a conventional plant to accomplish the present invention.

We have now discovered a method by which the cooling down procedure can be substantially accelerated by using an inert gas such as nitrogen, carbon dioxide, steam, etc., to moderate the burner flame temperature to a level of from about 2,600° to about 2,700° F. while the furnace is fired on fuel gas—and the acid gas line shut off—to remove sulfur from refractory and fire brick until all of the sulfur has been removed therefrom. Also, the reheat lines are purged with nitrogen or carbon dioxide until all moisture has been removed after which the furnace and boiler are cooled with blower air. Precautions are then taken to prevent air from entering the reactors following which the vent to the condenser immediately downstream of the boiler is open and an air blower is then used to cool the refractory in the furnace at a rate such that the cooling is not more than about 100° F. per hour until the furnace is cool enough for inspection. By the use of the our process a 290 ton per day train of the 580 ton per day plant referred to above it is possible to cool down the furnace to inspection temperature in about 2 days using only about $2,500 worth of nitrogen. With a single train of the plant running at full capacity before shut down this means a savings in most sulfur production of about $13,000 (3.5 days for the prior art v. 2 days time by the present invention) plus a $7,500 savings in nitrogen cost. Firing with a moderated flame temperature in this instance to remove sulfur from the furnace refractory required 14 hours at approximately 95 percent stoichiometric air.

DESCRIPTION OF A SPECIFIC EMBODIMENT

To illustrate further how our invention may be used in the accelerated cooling down of a conventional single train (750 long tons per day) sulfur plant, reference is made to the accompanying drawings and we will assume the plant has been in normal operation. After shutting off the flow of acid gas in line 2 and air in line 8, firing with fuel gas through line 4 into burner 6 is commenced. The flame in burner 6 is moderated with an air-$CO_2$ mixture coming from line 8, fed by inert gas line 10 and air line 12. Carbon dioxide is added via line 10 at the rate of 575 moles per hour and mixed with air in line 12 flowing at the rate of 5,390 moles per hour or about 5.1 percent of the design air rate. The maximum furnace temperature nearest the burner during this period is about 2,300° F. resulting in the sulfur being vaporized from the refractory in furnace 14, taken through boiler 16 and vented to the atmosphere via line 18 and the inlet of condenser 20 through a vent stack (not shown). Since initial analysis of this vent stack effluent indicates oxygen to be present, the fuel gas rate is increased until carbon is visible in the effluent vapors from said stack to ensure that there is no excess oxygen. During the first part of the high temperature firing procedure substantial quantities of sulfur fog are visible from the vent stack. After 9 hours of high temperature firing only traces of sulfur fog can be detected in the effluent steam from said stack. Following the sulfur removal step, first carbon dioxide (400 cubic feet per min.) and then air (13,600 cubic feet per min.) is used to force cool the furnace refractory to 700° F. in about 12 hours. Blower air is then used for final cool down of the furnace refractory to inspection temperature, requiring approximately 20 hours.

In order to prevent damage to the refractory by cooling in excess of 100° per hour, the furnace is allowed to cool by convection until the cool down rate is below 100° F. per hour (1,385° F. furnace temperature nearest the burner). At this time $CO_2$ is used to cool the furnace. After the furnace temperature reaches 933° F. (at the downstream end) $CO_2$ does not maintain the 100° F. per hour cool down rate and, accordingly, blower air coming into the system via line 3, is then used to cool the furnace. The air rate is gradually increased to approximately 40 percent of design air rate (13,600 SCFM) to force cool the furnace. The average cooling rate while force cooling with air is 34° F. per hour. After the furnace effluent temperature reaches 285° F. the air blower is taken out of service and final cooling accomplished by convection prior to the furnace and boiler inspection.

As previously mentioned inert gases such as nitrogen, $CO_2$ or steam may be used in our cool down process wherein burner flame temperatures are moderated down to 2,600° to 2,700° F. during the initial phase of the method. The volumes of these various diluents required to produce such temperatures are shown below and are based on 10.2 percent of plant design air rate, 5 percent furnace heat loss and 95 percent stoichiometric air:

| Inert Gas | Volume Ratio of Gaseous Diluent to Dry Air |
| --- | --- |
| $CO_2$* | 0.23 |
| Steam | 0.30 |
| Nitrogen | 0.35 |
| Liquid $CO_2$ | 0.20 |

*This $CO_2$ contained 9.71 percent hydrocarbons, 6.48 percent of which was $C_1$ and the remainder was $C_2-C_7+$.

We claim:

1. In a method for the recovery of free sulfur from a gaseous mixture containing hydrogen sulfide which method includes the burning of said hydrogen sulfide with air in a refractory lined combustion zone to produce free sulfur and a reaction mixture of $H_2S$ and $SO_2$, whereby deposits of said sulfur accumulate in said refractory, separating the undeposited free sulfur from said reaction mixture, subsequently reacting the latter in a reaction zone in contact with a catalyst to produce free sulfur, the improvement which comprises moderating the flame temperature in said combustion zone to lower the temperature therein, such lowering of temperature being effected by discontinuing the flow of said gaseous mixture and burning in said combustion zone a combustible mixture of fuel gas, air and an inert gas whereby the sulfur accumulated in said refractory is vaporized and driven therefrom, continuing the burning of said combustible mixture until the sulfur on said refractory has been substantially completely vaporized therefrom, discontinuing burning such combustible mixture and shutting off the flow thereof to said combustion zone, next force cooling said refractory by injecting an inert gas into said combustion zone in an amount sufficient to lower the temperature in said zone at a rate of from about 75° to about 100° F. per hour until the temperature of the effluent from said zone is not more than about 900° F., and thereafter force cooling said refractory with blower air in a volume and at a rate such that the average cooling rate is from about 25° to about 35° F. per hour.

2. The method of claim 1 wherein the force cooling step with blower air is continued until said combustion zone reaches a temperature of about 275° to about 300° F.

3. The method of claim 2 in which further cooling to ambient temperature is effected by means of convection.

4. In a method for the recovery of free sulfur from a gaseous mixture containing hydrogen sulfide which method includes the burning of said hydrogen sulfide with air in a refractory lined combustion zone to produce free sulfur and a reaction mixture of $H_2S$ and $SO_2$, whereby deposits of said sulfur accumulate in said refractory, separating the undeposited free sulfur from said reaction mixture, subsequently reacting the latter in a reaction zone in contact with a catalyst to produce free sulfur, the improvement which comprises moderating the flame temperature in said combustion zone to lower the temperature therein, such lowering of temperature being effected by discontinuing the flow of said gaseous mixture into said combustion zone and burning in place of said gaseous mixture in said combustion zone a combustible mixture of fuel gas, air and an inert gas whereby the sulfur accumulated in said refractory is vaporized and driven therefrom, continuing the burning of said combustible mixture until the sulfur of said refractory has been substantially completely removed, discontinuing burning such combustible mixture and shutting off the flow thereof to said combustion zone, and thereafter force cooling said zone down to about ambient temperature by the use of a gaseous stream.

5. The method of claim 4 in which the force cooling step is effected by the successive use of an inert gas and air.

6. The method of claim 5 in which the inert gas employed is $CO_2$.

7. The method of claim 4 in which the inert gas employed is nitrogen.

8. The method of claim 4 in which the inert gas employed is steam.

9. The method of claim 5 wherein the volume ratio of inert gas to air employed to moderate the flame temperature in said combustion zone ranges from about 0.20:1 to about 0.35:1.

10. The method of claim 4 in which the force cooling step is effected by the use of air.

* * * * *

PO-1050
(5/69)

UNITED STATES PATENT OFFICE
CERTIFICATE OF CORRECTION

Patent No. 3,617,221            Dated    November 2, 1971

Inventor(s) Jimmy D. Egan, Homer H. Woodall, Jr., Lorenz V. Kunkel

It is certified that error appears in the above-identified patent and that said Letters Patent are hereby corrected as shown below:

Column 1, line 67, following "30" insert -- $\phi$ --.

Claim 4, line 17, "of", second occurrence, should read -- on --.

Signed and sealed this 30th day of May 1972.

(SEAL)
Attest:

EDWARD M. FLETCHER, JR.            ROBERT GOTTSCHALK
Attesting Officer                   Commissioner of Patents